United States Patent [19]

Miyajima et al.

[11] Patent Number: 4,652,932
[45] Date of Patent: Mar. 24, 1987

[54] LIQUID CRYSTAL DISPLAY TELEVISION RECEIVER

[75] Inventors: Akira Miyajima; Akira Tsuzuki; Hideshi Ohno; Shigeru Futakami; Takashi Ogura; Toshiaki Oguchi, all of Tokorozawa; Masaru Yoshida, Tanashi; Satoshi Kimura, Tanashi; Kotaro Takahashi, Tanashi; Hiroya Sakamoto, Tanashi; Koichi Nakajima, Tanashi, all of Japan

[73] Assignee: Citizen Watch Co., Ltd., Japan

[21] Appl. No.: 721,755

[22] Filed: Apr. 10, 1985

[30] Foreign Application Priority Data

Apr. 10, 1984 [JP] Japan ................................ 59-71542

[51] Int. Cl.$^4$ .......................... H04N 5/64; H04N 5/74
[52] U.S. Cl. ..................................... 358/236; 358/241; 358/254
[58] Field of Search ............... 358/236, 230, 241, 254, 358/56, 59, 60; 340/784; 350/345

[56] References Cited

U.S. PATENT DOCUMENTS 4,561,044 12/1985 Ogura ................................ 358/236

FOREIGN PATENT DOCUMENTS

2153620 8/1985 United Kingdom ................ 358/230

*Primary Examiner*—Tommy P. Chin
*Attorney, Agent, or Firm*—Lowe, Price, LeBlanc, Becker & Shur

[57] ABSTRACT

A television receiver employs a liquid crystal display panel mounted in a unit which can be set into either a closed position in which the display panel is disposed within a recessed portion of the case of the television set, and an opened position in which ambient light passes through the display panel to be reflected from a mirror towards the viewer. In conjunction with this arrangement, operating control members are positioned to facilitate one-hand operation of the receiver, and the largest circuit components and batteries are positioned with respect to the display panel and control members such as to minimize the overall size of the receiver.

12 Claims, 15 Drawing Figures

LIQUID CRYSTAL DISPLAY TELEVISION RECEIVER

BACKGROUND OF THE INVENTION

The present invention relates to a liquid crystal display television receiver, and in particular to a liquid crystal display television receiver wherein the components are arranged such as to enable the television set to be made extremely compact, thin and light in weight, and extremely convenient to operate, and which moreover provides a clear television picture utilizing only incident ambient illumination.

In recent years, various types of portable battery-powered electronic devices such as calculators, games, etc, which are sufficiently small and lightweight to be readily accommodated within the user's pocket. Such devices generally employ a liquid crystal display, together with low-consumption circuit elements, and so have a long battery life. Various attempts have been made to produce a television receiver which will provide similar characteristics. Such prior art types of television receiver can be broadly divided into those which employ a miniature CRT and those which employ a liquid crystal display panel. It has been found possible to produce CRT type miniature television receivers which are reasonably compact, although somewhat larger in size than can be readily fitted into a pocket. However with such a receiver, the display screen is invariably small, by comparison with the outer dimensions of the set, so that the picture of a very compact receiver of this type is excessively small and therefore difficult to view. In addition, a substantial level of power will be consumed by any type of CRT display, so that it is difficult to ensure sufficiently long battery life. Furthermore it is necessary to use very high voltages to drive the CRT, even in the case of a miniature display, and the requisite drive circuits are complex and expensive to manufacture and it is difficult to make the overall weight of the set sufficiently low. Furthermore, when a CRT type television receiver is utilized outdoors in bright sunlight, the display contrast is reduced to such an extent that it becomes difficult to view the picture.

Those compact television receivers which employ a liquid crystal display panel can be divided into two basic types, i.e. those which employ a rear-reflector type of display, in which light which is incident on the display panel passes through the panel to be reflected from a rear reflector plate to pass back through the panel towards the viewer, and those which are of transmission type, whereby the television picture is viewed as light which has passed through the display panel from a light source disposed at the opposite side of the panel. This light source can be either ambient illumination or a specifically provided light source. Either of these types of television receiver could benefit from the advantages of a liquid crystal display panel, i.e. the overall size can be made thin and compact, and the set can be made light in weight. In addition, due to the capability of operating a liquid crystal display panel at low levels of drive voltage, the drive circuits can be made very simple, and moreover the level of power consumption is extremely low. However in fact, the liquid crystal display television receiver which have been produced up until the present have been fairly large in size and excessively heavy, and cannot be said to be truly suitable for the user to carry in a pocket.

In the case of liquid crystal display television receivers which employ a rear reflector plate, there may be an insufficient level of incident illumination upon the display, since this illumination must arrive from a direction which is substantially perpendicular to the display panel, i.e. along the same direction as that from which the user is viewing the display. Thus, this incident illumination may be partially blocked by the viewer's body, chair, etc. Furthermore if the maximum level of incident illumination occurs along some other direction (e.g. from the sky, or a lamp disposed above the set), the orientation of the display screen which is most convenient for the user may be totally different from the orientation which provides a maximum level of incident light for viewing the display. Another disadvantage is that light must pass through the liquid crystal display panel twice in succession, i.e. absorption of light within the panel will occur twice, so that the efficiency of utilization of incident light is low. For these reasons, it may not be possible to obtain a sufficiently bright displayed image with such a type of liquid crystal display television receiver.

For these reasons, a liquid crystal display television receiver according to the present invention employs a transmission type of liquid crystal display panel, as described hereinafter.

SUMMARY OF THE DISCLOSURE

It is an object of the present invention to overcome the disadvantages of prior types of compact, portable television receiver, by providing a liquid crystal display television receiver having a display panel configuration and arrangement of components such that the television set can be made very thin in shape and of compact outer dimensions, and moreover whereby a high degree of display brightness can be attained, utilizing only incident ambient illumination.

In order to attain the above objectives, a liquid crystal display television receiver according to the present invention comprises a case which contains the circuit elements of the set, i.e. receiving circuits, drive circuits, control circuits, etc, and in which are also mounted a loudspeaker, external operating members, and batteries. Such a television receiver further comprises a picture display block which can be swung into a closed position with respect to the housing, for maximum portability, and swung into an open position in which the television picture can be viewed. The picture display block contains a transmission-type liquid crystal display panel, and a mirror is fixedly mounted on the case in such a position that when the picture display block is in the open position thereof, the television picture can be viewed as light which has been transmitted through the liquid crystal display panel and reflected from this mirror. It is an essential feature of such a television receiver that the picture display block is mounted in a central region of the case, with the loudspeaker and operating members being mounted towards the right-hand side of the picture display block (as the set would normally be viewed) and the tuner and batteries being disposed at the rear of the picture display block. It is a further feature of such a receiver that the tuner and batteries are positioned close to the rear face of the case, and are of size selected such that the height of each above the rear face of the case is substantially identical. In addition, the batteries are positioned near the left-hand side of the case.

Such an arrangement of the essential components of such a liquid crystal display television receiver enables the overall configuration to be made extremely compact. Alternatively stated, such a configuration enables a sufficiently large display area to be provided for ease of viewing, even when the overall size of the set is sufficiently compact for ease of portability in the user's pocket. In addition, the picture display arrangement, employing reflection of light which has passed (once) through a transmission-type liquid crystal display panel, provides a clear and bright picture under various types of high or low ambient illumination.

DESCRIPTION OF THE PREFERRED EMBODIMENTS

Figure 2A:
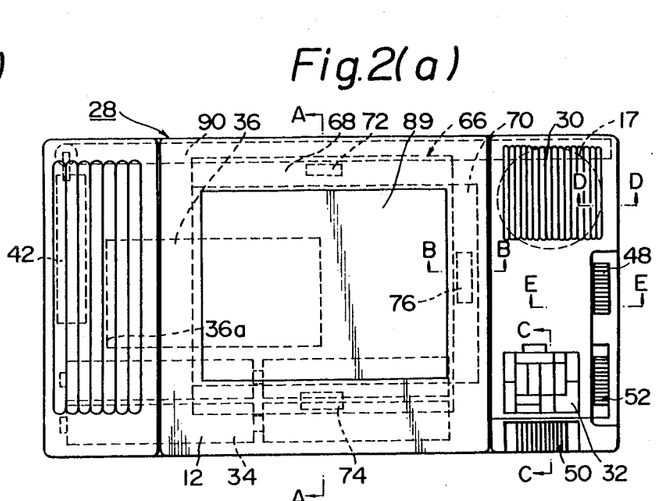
FIGS. 2(a), 2(b), 2(c) and 2(d) are respectively external views in plan, in elevation (of the front side), and in elevation (of the left and right-hand sides) respectively of the preferred embodiment.
Figure 2B:
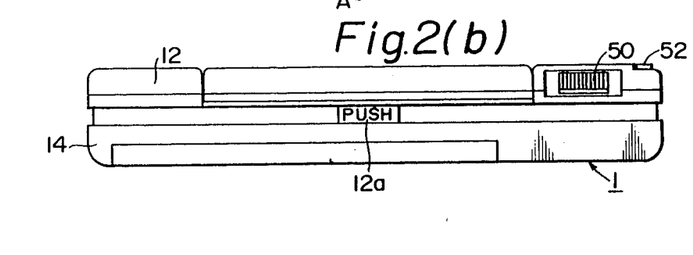
Figure 2C:
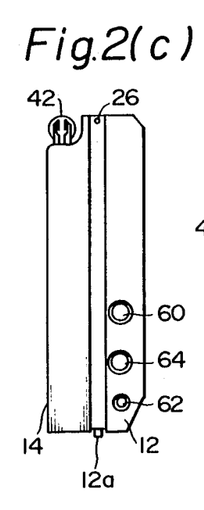
Figure 2D:
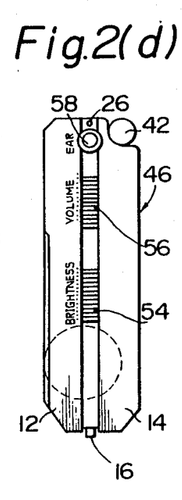
Figure 3:
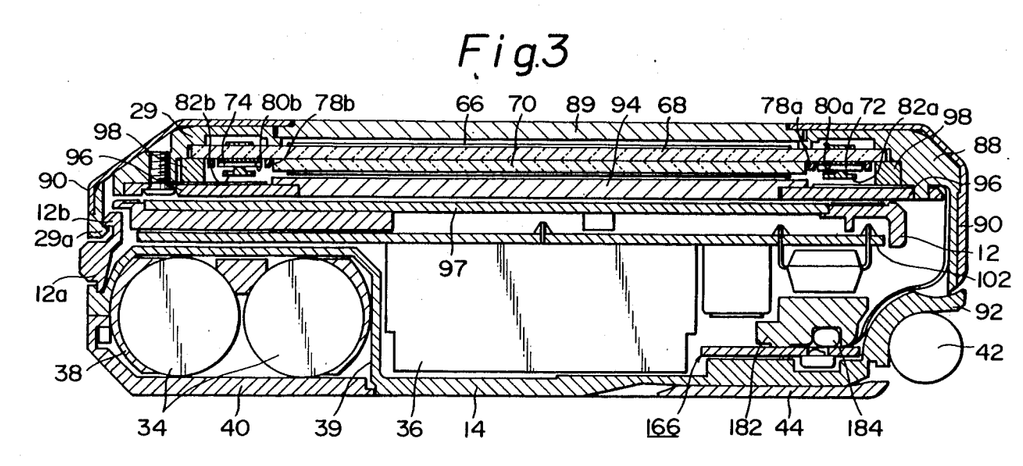
FIGS. 3 and 4 are respectively cross-sectional views along lines A—A and B—B in FIG. 2(a), for assistance in describing the configuration of a picture display block in the preferred embodiment.

The external configuration of the preferred embodiment will first be described, referring initially to FIGS. 1, 2 and 3. In these drawings, numeral 1 denotes a case, which is formed of an upper shell 12 and a lower shell 14, respectively formed from synthetic resin such as polycarbonate resin, by injection molding. To avoid ambiguity in the following description and in the claims, the upper side of the television set as viewed in plan in FIG. 2(a) will be consistently referred to as the upper side, the opposite side of the set thereto will be referred to as the lower side, the frontward-facing side as viewed in FIG. 2(b) will be referred to as the front side and the opposite side thereto as the rear side, while the two sides shown in elevation respectively in FIGS. 2(c) and 2(d) will be referred to as the left side and right side respectively. A recessed central region of shell 12 is shaped to accommodate a picture display block 28, which is movably mounted at one end thereof on case 1 such as to permit picture display block 28 to swing either to the position shown in FIG. 1(a), in which the upper face thereof is substantially flush with the upper face of upper shell 12, which state will be referred to in the following as the closed state, and the position shown in FIG. 1(a), in which picture display block 28 is inclined at a specific angle from the plane of the upper face of shell 12. The latter condition will be referred to as the opened state. A mirror 97 is fixedly mounted within this recessed central region of upper shell 12, with the plane of the mirror substantially parallel to the plane of the upper face of shell 12, and positiioned such that picture display block 28 becomes disposed closely adjacent to and parallel to the mirror when the picture display block is set in the closed state referred to above.

Figure 1A:
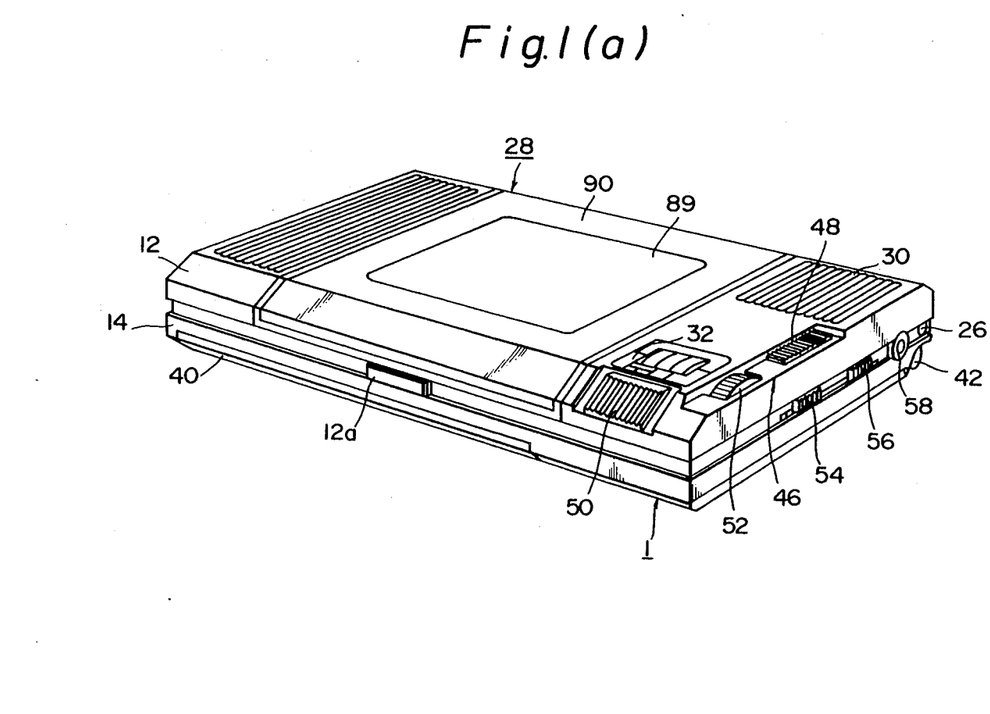
FIG. 1(a) is an oblique external view of a preferred embodiment of a lctelevision receiver according to the present invention, in a closed state, for portability.

The coupling between picture display block 28 and upper shell 12 is such that, when a release push-button 12a (integrally formed in the front side of upper shell 12) is depressed while the set is in the closed state shown in FIG. 1(a), a linkage between a hook 12b formed in upper shell 12 and a recessed portion 29a formed in a panel shell 29 is released. As a result, picture display block 28 swings upward, moving around a shaft 26 as a center of rotation, to attain the position shown in FIG. 1(b). In this embodiment, the inclination of picture display block 28 produced in this way is set at approximately 50° from the plane of the upper face of the set. It has been found that such an angle of inclination will provide excellent viewing characteristics over a wide range of viewing positions, both from theoretical considerations and from the results of experiments.

Figure 1B:
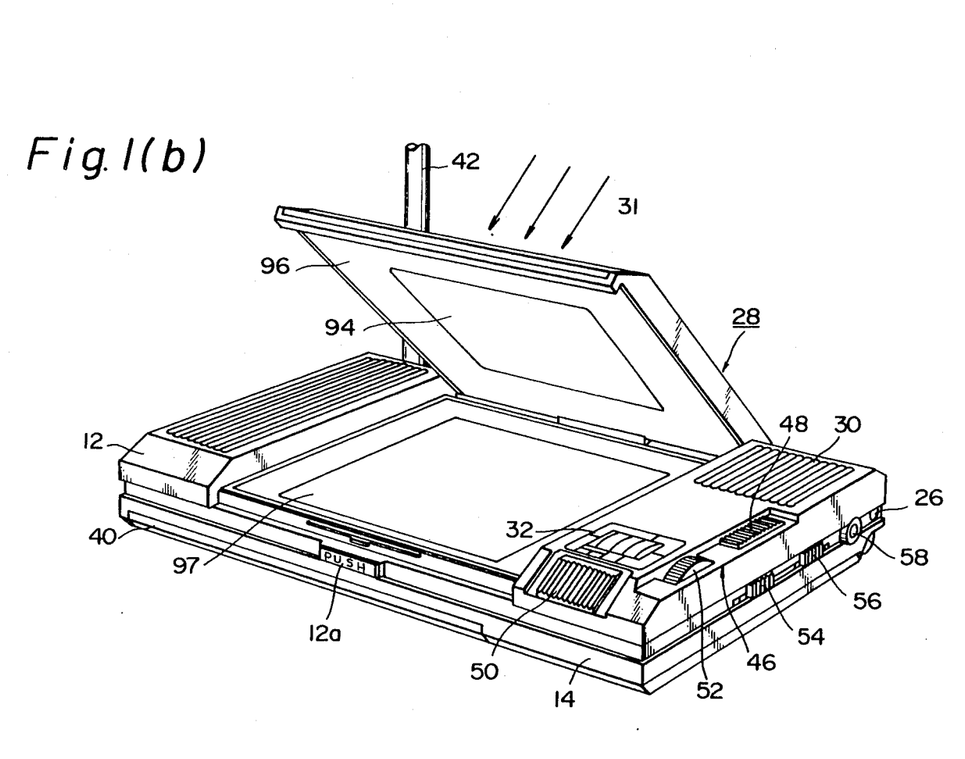
FIG. 1(b) is an oblique external view of the embodiment of FIG. 1(a), in an opened state, for viewing.

As illustrated in FIG. 1(b), incident light 31 passes through a liquid crystal display panel 94 in picture display block 28, and the image thus formed is reflected from mirror 97, towards the user. It can thus be clearly understood that there is no danger of illumination 31 being shielded by the user's body, thereby ensuring maximum illumination of the display. Furthermore, the light passes through liquid crystal display panel 94 only once, and since mirror 97 can be designed to provide a high degree of reflectance, the amount of absorption of incident illumination 31 is minimized.

A grille 30 for a loudspeaker 17 is positioned in the upper right-hand region of upper shell 12, while a channel indicator display 32 is disposed in the lower right-hand region of shell 12.

Numeral 34 denotes a set of batteries, which provide power to operate the set. As shown in FIG. 3, batteries 34 are arranged as a set of 4 units formed into two side-by-side rows of two batteries (UM-3 type), and are positioned at the lower left-hand side of the set. A tuner unit 36 is positioned as shown in FIGS. 2 and 3, slightly above the upper face of lower shell 14. The component sizes are selected such that the height occupied by tuner unit 36 above lower shell 14 is almost identical to that occupied by batteries 34, as is clear from FIG. 3. Batteries 34 are retained in a battery pack 38. This arrangement enables batteries 34 to be positioned immediately below picture display block 28, within a battery chamber which is formed by a portion 39 of lower shell 14, held by a removable battery chamber cover 40. Such a position for the batteries has been selected from considerations of minimizing damage to the television receiver in the event of electrolyte leakage from the batteries, and also from the aspect of facilitating battery changeover.

Numeral 42 denotes a rod antenna for receiving television signals, which is mounted in the lower part of the rear side (as defined hereinabove) of case 1. To utilize rod antenna 42, it is first pulled out by one stage from the fully retracted position, then is rotated and extended. The position selected for rod antenna 42 enables the antenna to be extended while picture display block 28 is in the open state, and enables the antenna to be set into a wide variety of positions when extended. Optimum signal reception and picture quality can thereby be attained.

Numeral 44 denotes a stand, formed on lower shell 14. This can be moved into an opened or a closed condition, to enable the set to be positioned at an optimum viewing angle when it is set upon a horizontal surface.

Numeral 46 denotes a set of external operating members, for use by the viewer, which are positioned at the right-hand side of case 1. A 3-position slider switch 48 is used to select the power on/off states and also for selection of television reception or AM radio reception. Numeral 50 denotes a band selector slider switch, for selecting the television band to be received. A channel selector knob 52 protrudes slightly outside case 1, for selection of the TV or radio channel to be received. Numeral 54 denotes a brightness control slider, for adjusting the brightness of the television picture, while numeral 56 denotes a volume control slider, for adjustment of loudspeaker volume.

Jacks are provided on the right and left sides of case 1, to extend the functional capabilities of the set. Jack 58 is an earphone jack. Jack 60 is an external antenna jack. Jack 62 is used for connection of an external power supply, e.g. for operating the receiver from an external battery pack, an AC adaptor, car battery adaptor, etc. Numeral 64 denotes a video input jack, whereby a video signal can be input to the receiver from an external device. This feature enables the receiver to be used, for example, as a monitor for a video camera, or as a terminal for a personal computer or other data processing equipment, so that the receiver can be used for a wide range of applications in addition to normal TV reception.

Figure 4:
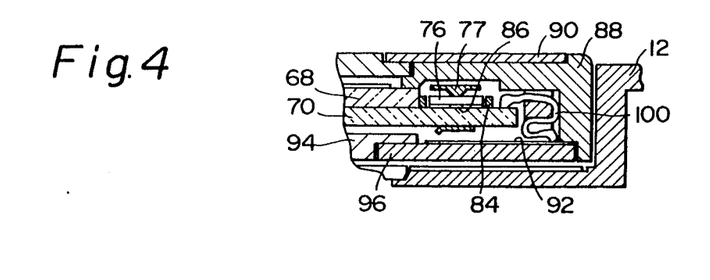

Referring to the cross-sectional views of FIG. 3 and FIG. 4, the picture display block 28 will now be described. The liquid crystal display panel 66 comprises an upper transparent substrate 68 and a lower transparent substrate 70, which are spaced apart by a minute fixed distance with a layer of liquid crystal material sandwiched between them. Data electrode drive circuits 72 and 74, in the form of integrated circuits, are mounted upon portions of upper transparent substrate 68 which extend beyond the periphery of lower transparent substrate 70, while scanning electrode drive circuit 76, also in IC form, is mounted on a portion of lower transparent substrate 70 which extends beyond the periphery of upper transparent substrate 68.

The manner of mounting and connecting data electrode drive circuits 72 and 74, and of scanning electrode drive circuit 76 will now be described, referring to FIG. 3. In FIG. 3, numerals 78a and 78b denote shell members which respectively serve to fix the mounting positions of data electrode drive circuits 72, 74, and which are fixedly attached to upper transparent substrate 68. Numeral 80a, 80b denote connectors, which are of sheet configuration and formed from rubber, with conductive portions formed therein. These serve to provide very low-resistance interconnection paths between terminals of data electrode drive circuits 72, 74 respectively and external circuits. Numeral 82a, 82b denote clamping springs, which respectively apply pressure forcing data electrode drive circuits 72, 74 into close contact with connectors 80a, 80b, to thereby provide satisfactory electrical contact therewith.

In a similar way, a shell member 84 fixedly mounted on lower transparent substrate 70 serves to position scanning electrode drive circuit 76, while 86 denotes a rubber connector for providing connections to scanning electrode drive circuit 76, in cooperation with a clamping spring 77.

The liquid crystal display panel 66, having the configuration described above, is supported and retained in a fixed orientation by means of a panel shell 88, which is the principal structural member of picture display block 28. An upper shield plate 89 is formed of transparent material, with the lower face thereof being slightly roughened such as to produce a translucent effect, whereby shield plate 89 produces dispersion of light transmitted therethrough. A decorative outer plate 90 is fixedly attached to panel shell 88, with shield plate 89 being held clamped between these. In this way, panel shell 88, shield plate 89 and decorative outer plate 90 are held mutually attached.

Numeral 92 denotes a flexible circuit board which is used to provide connection to a second circuit block (described in the following). Numeral 94 denotes a lower shield plate, which is transparent and is fixedly attached to a panel support plate 96 which serves as a reinforcing member for flexible circuit board 92. Numeral 98 denotes a connector for output of the data signals, which serves to provide electrical connection between an input electrode pattern formed on upper transparent substrate 68 of liquid crystal display panel 66 and flexible circuit board 92. Numeral 100 denotes a connector for output of the scanning signals from scanning electrode drive circuit 76, and serves to connect an input electrode pattern which is formed on lower transparent substrate 70 and flexible circuit board 92.

The sequence in which picture display block 28 is assembled at the time of manufacture is as follows. Firstly, the scanning signal connector 100, liquid crystal display panel 66 and data signal connector 98 are successively mounted upon panel frame 88. Panel frame 88 and panel support plate 96 are then mutually attached by means of screws.

Figure 5A:
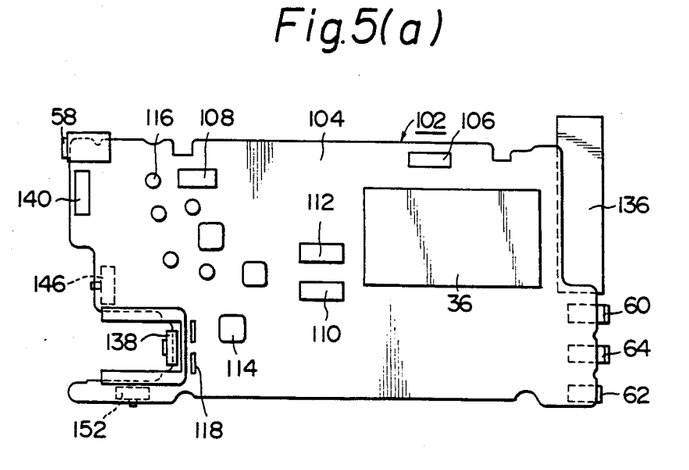
FIGS. 5(a) and 5(b) are views in plan of each side of a first circuit block.
Figure 5B:
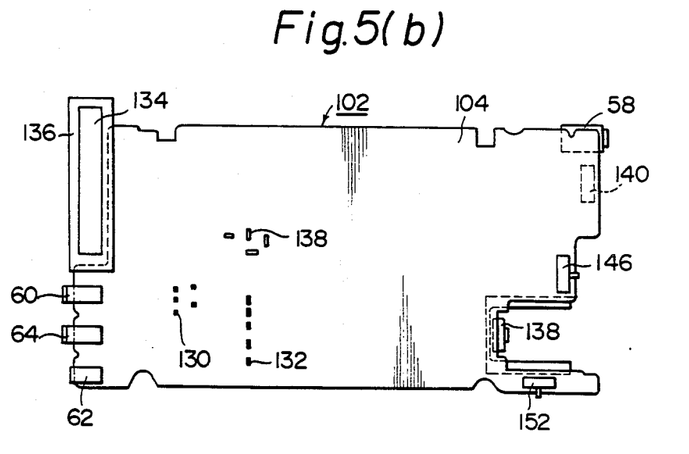

The electronic components of the television receiver, other than the liquid crystal display panel and the above-mentioned drive circuits therefore, are separated into a primary circuit block and a secondary circuit block, which are respectively formed upon separate circuit boards. Primary circuit block 102 will be described, referring primarily to FIG. 5(a), 5(b) but also to the various cross-sectional views in other drawings. The external configuration of this block is shown in FIG. 5, in which numeral 104 denotes the circuit board, upon which other components are mounted. When assembled into the TV receiver, the side which is shown in FIG. 5(a) will become the lower side, while that shown in FIG. 5(b) will become the upper side. In FIG. 5, numeral 36 denotes a tuner unit, for providing television reception in the UHF and VHF wavebands. In order to minimize overall size, tuner unit 36 is formed as a single integral unit, and is mounted such as to be positioned over and immediately adjacent the upper face of lower shell 14, beside batteries 34 (as shown in FIG. 3). Integrated circuits 106, 108, 110 and 112 are also mounted on circuit board 104, together with a coil 114, electrolytic capacitor 116, variable resistor 118 and the set of jacks described hereinabove, i.e. earphone jack 58, external antenna jack 60, external power supply jack 62 and video input jack 64, On the opposite side of circuit board 104, as shown in FIG. 5(b), are mounted a set of transistors 138, in chip configuration, together with a set of capacitors 130 and a set of resistors 132. Numeral 134 denotes a ferrite bar antenna, used for AM radio reception. Ferrite bar antenna 134 is supported and retained by an antenna support frame 136 (which is fixedly attached to circuit board 104) such as to be positioned at the left side of the set, with the elongated axis of bar antenna 134 being perpendicular to the direction of elongation of the television set.

Figure 8:
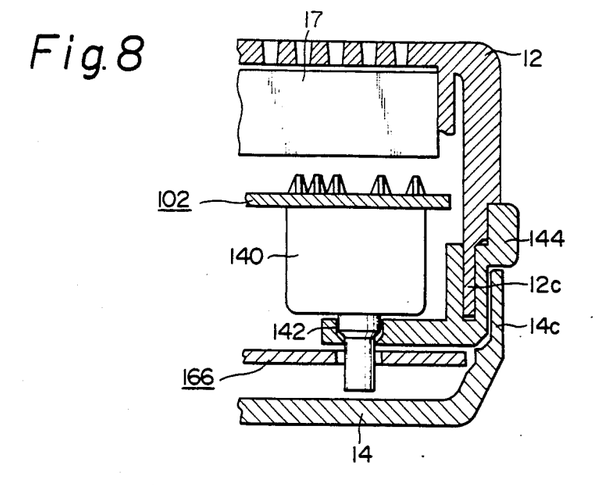

Numeral 140 denotes a potentiometer used as a volume control. As shown in FIG. 8, a linkage portion 142 formed on the potentiometer shaft engages with a linking lever formed integrally with volume control slider 56, described hereinabove. This linking lever passes between spacer portion 14c formed in lower shell 14 and step portion 14c formed in upper shell 12.

Figure 9:
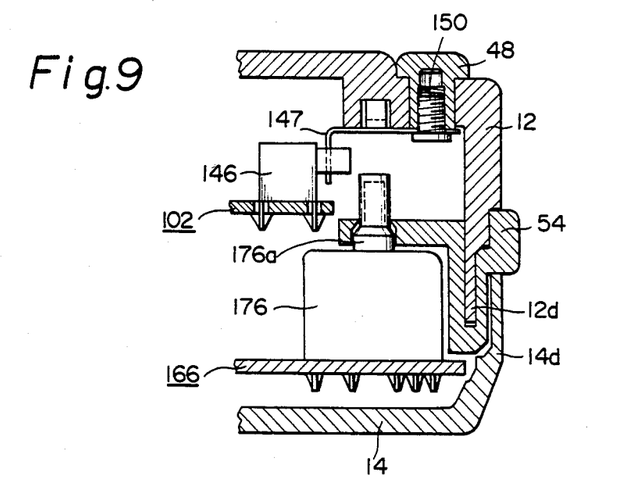

Numeral 146 denotes a power supply switch, which engages with a power supply switch stop plate 148 as illustrated in FIG. 9. Power supply switch stop plate 148 is fixedly attached to a power supply switch slider 48 by a screw 150.

Figure 7:
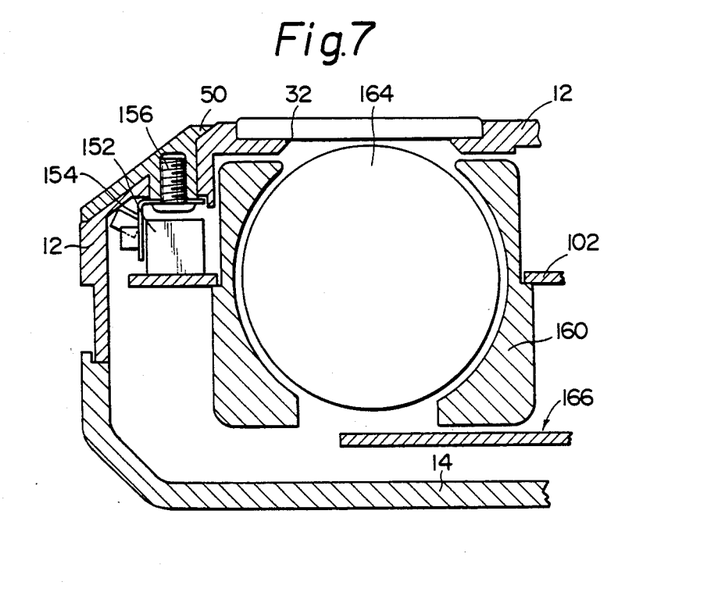
FIGS. 7, 8 and 9 are respectively cross-sectional views taken along lines C—C, D—D and E—E in FIG. 2(a), for assistance in describing positioning of external operating members.

Numeral 152 denotes a band selection switch. As shown in FIG. 7, this engages with a band selection switch stop plate 154 which is fixedly coupled to band selection switch slider 50 described hereinabove, by attachment screw 156.

Numeral 160 denotes a channel indicator drum supporting frame. The positional relationship between this and lower shell 104 is as shown in FIG. 7. Frame 160 serves to position and support channel selection potentiometer 138 and channel indicator drum 164 at the lower right-hand region of the television set. Channel selection potentiometer 138 is fixedly attached to channel indicator drum 164 by screws, while in addition channel indicator drum 164 is fixedly attached by screws to channel selection knob 52 which is shown in FIG. 2. Thus, when channel selection knob 52 is rotated, the slider of channel selection potentiometer 138 is rotated together with channel indicator drum 164, to thereby enable selection of a desired channel. This arrangement serves to eliminate the possibility of deviation between the channel which is indicated by drum 164 and that which is actually selected.

A television signal received from rod antenna 42 is input to the antenna input terminal of tuner 36, and a corresponding IF signal is output from tuner 36. The circuits in which this signal is subsequently processed are arranged such as to provide a substantially unidirectional signal flow, with minimization of signal feedback, and are also positioned with respect to the jacks and switches such as to minimize the possibility of interference pick-up. To this end, the audio amplifier circuit, volume control potentiometer 140 and earphone jack 58 are positioned to be mutually adjacent, to thereby minimize the lengths of connecting lead paths between these components and also minimize the space which these occupy.

It can be understood from the above that the configuration of the primary circuit block is such that large, essentially discrete components such as tuner unit 36 are mounted upon the lower side of circuit board 104, while small components such as transistors in chip form are mounted on the upper side thereof. Such an arrangement serves to facilitate mounting of the components during manufacture, and makes it easier to automate this mounting process.

Figure 6:
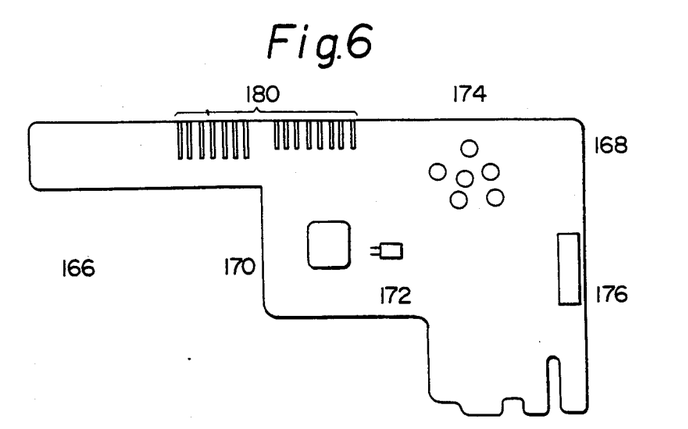
FIG. 6 is a plan view of a second circuit block.

The secondary circuit block will now be described. The external appearance of this circuit block is shown in FIG. 6, in plan view, in which numeral 168 denotes the circuit board. The following description will be given mainly with reference to FIG. 6, but will refer also to the cross-sectional views when necessary. The circuit board 168 has an integrated circuit 170 mounted thereon, together with a quartz crystal vibrator 172, for producing a reference frequency signal. In addition a group of electrolytic capacitors 174, brightness control potentiometer 176, as well as transistors in chip form, resistors and capacitors (not shown in the drawings) are also mounted on circuit board 168. As shown in FIG. 9, a lever engaging section 176a formed on the shaft of brightness control potentiometer 176 is engaged with a coupling lever portion which is integrally formed with brightness adjustment slider 54, and which moves between a step portion 12d formed in upper shell 12 and a step portion 14d formed in lower shell 14.

Numeral 180 denotes a conductive pattern which serves to electrically connect secondary circuit block 166 and picture display block 28 described above. As shown in FIG. 3, flexible sheet connector 92, which provides connection between conductive pattern 180 and liquid crystal display panel 66 is held pressed against conductive pattern 180 on circuit board 168 by the action of a rubber compression member 184, which is supported by connector supporting frame 182. Supporting frame 182, is attached to circuit board 168 by screws.

The layout of electronic components which are mounted on the lower side of primary circuit block 102 and on the upper side of secondary circuit block 166 is such as to facilitate separation of these components into separate sub-blocks in accordance with the component functions, and such as to reduce stray capacitance and induction. The layout is further planned such as to reduce the overall thickness to a minimum.

In the following, a description will be given of the manner in which the present invention enables a liquid crystal display television receiver to be made extremely thin and compact, with enhanced ease of operation. The principal components of a liquid crystal display television receiver which determine the external dimensions of the set are the liquid crystal display panel 94, the operating section 46, loudspeaker 17, batteries 34, and tuner unit 36. Various experiments were carried out to determine the optimum relationships between the positions of circuit components and the shapes of circuit boards 104 and 168, such as to enable an optimum arrangement of interconnecting leads and maximum ease of operation. The final layout which was reached on this basis enables a high degree of compactness and portability to be attained. The following conditions were set with regard to component layout:

(1) The layout should be such that the user can hold the television receiver in his or her left hand, and operate the set with the right hand. However it should also be possible, when necessary, for the user to operate the set by using the left hand.

(2) The picture display block 28 should be positioned such as to provide maximum ease of viewing.

(3) The positions of batteries 34 should be such as to provide ease of insertion and removal of the batteries.

(4) The distance between rod antenna 60 and the antenna input terminal of tuner unit 36 should be a minimum, to prevent attenuation of the received antenna signal and to maintain a high signal/noise ratio.

In order to satisfy the above four conditions, picture display block 28 is disposed in a central region of the television set, with the operating section 46 and loudspeaker 17 being disposed at the right-hand side of this central region (as viewed in FIG. 2(a)). In addition, tuner unit 36 and batteries 34 are disposed at the rear of picture display block 28, with the vertical height (above lower shell 14) and vertical positions of tuner unit 36 and batteries 34 being almost identical. Also, to ensure that overall thickness of the set can be minimized, tuner unit 36 and batteries 34 are each positioned such that they do not overlap any other components of substantial thickness, i.e. are disposed side by side within the central region of the set (containing picture display block 28 as stated above) and a region to the left of this central region. These positional relationships are made clear from FIGS. 2(a) and 3, and, in conjunction with the movable configuration of picture display block 28 between an open and a closed state as described hereinabove, enable such a liquid crystal display television receiver to be made substantially more thin and compact than has been possible in the prior art.

Figure 10A:
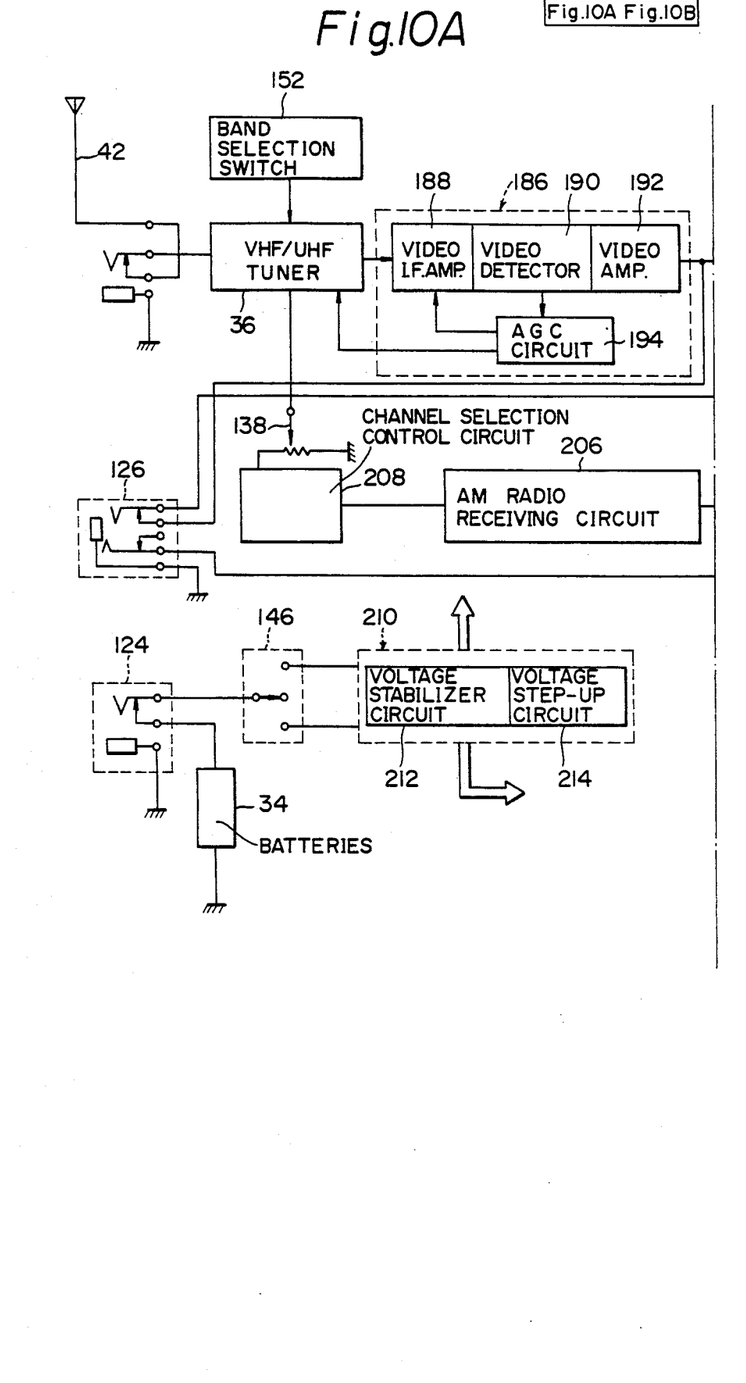
FIG. 10 is a general block circuit diagram of the preferred embodiment.
Figure 10B:
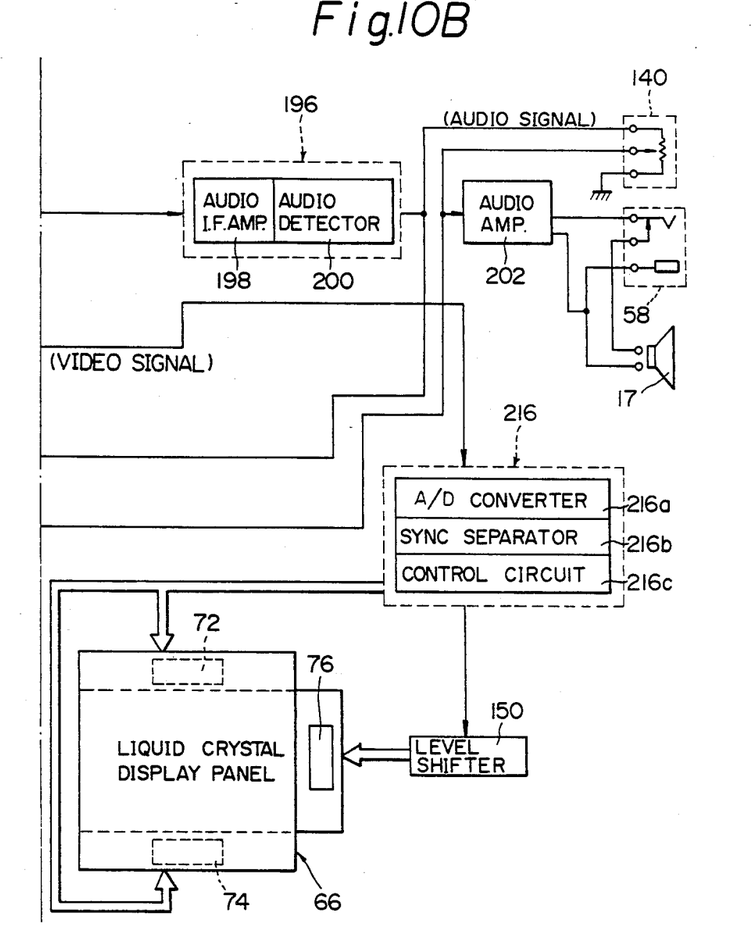

The overall circuit system of the preferred embodiment will now be described, referring to the block circuit diagram of FIG. 10. Numeral 186 denotes the video receiving circuit, which comprises a video IF amplifier circuit 188, a video detector circuit 190, a video amplifier circuit 192 and an AGC circuit 194. These are implemented in integrated circuit form, constituted by integrated circuit 110 together with a few external components coupled thereto. Numeral 196 denotes an audio receiving circuit, which comprises an audio IF amplifier circuit 198, and an audio detector circuit 200. These are implemented in integrated circuit form, constituted by integrated circuit 108, together with a few external components coupled thereto. Numeral 202 denotes an audio amplifier circuit, which is implemented as an integrated circuit 112 with some external components coupled thereto. Numeral 206 denotes an AM radio receiving circuit, which is implemented as an integrated circuit 106, together with external components including a coil 36, capacitor 116 and a ferrite bar antenna 134. Numeral 208 denotes a channel selection control circuit, which comprises potentiometer 138 and tuner unit 36, and serves to select the desired television channel. Numeral 210 denotes the power supply circuit, comprising a voltage stabilizer circuit 212 and a voltage step-up circuit 214. The latter circuits serve to step-up the output voltage from batteries 34, and to produce a number of stabilized supply voltages.

Numeral 216 denotes a drive control circuit, in integrated circuit form, comprising an analog-digital converter circuit 216a, a sync separator circuit 216b, and a control circuit 216c. Part of the output signals from drive control circuit 216 is input to a level shifter circuit 180, while another part of these output signals are input to data electrode drive circuits 72 and 74.

The operation of the above circuits is as follows, in the case of television reception. The desired television channel is selected from the antenna signal, by tuner unit 36 under the control of channel selection control circuit 208, i.e. the RF antenna signal is converted to an IF signal which is input to video receiver circuit 186. This signal is then amplified by video IF amplifier circuit 188, whose output is input to video detector circuit 190. The resultant video signal which is output from video detector circuit 190 is input to analog-digital converter circuit 216a and to sync separator circuit 216b of drive control circuit 216. A/D conversion of the video signal is thereby performed, together with separation of the vertical and horizontal sync signal pulses. Control circuit 216c serves to maintain a fixed relationship between the sync signal pulses which are separated from the video signal and sync signal pulses which are generated within the system itself. The output signal from A/D converter circuit 216a is input to data electrode drive circuits 72 and 74. The output signal from control circuit 216c is input to level shifter circuit 180, to be shifted in voltage level. The output signal from level shifter circuit 180 is input to scanning electrode drive circuit 76, to drive liquid crystal display panel 66. In this way, a television picture is produced on liquid crystal display panel 66.

The audio component of the television signal is produced as a 4.5 MHz beat-frequency component (intercarrier component) of the output from the video detector circuit, which is input to audio receiver circuit 196. This signal component is thereby amplified by amplifier circuit 198, and detected by audio detector circuit 200 to produce the desired audio signal. This is then amplified by amplifier circuit 202, and applied to loudspeaker 17.

The portions of the circuit system subsequent to production of the video signal are all implemented on secondary circuit block 166, while the other portions of the circuit system are implemented on primary circuit block 102.

The advantages obtained by a configuration for a liquid crystal display television receiver according to the present invention as described hereinabove can be summarized as follows:

Firstly, due to the thin shape and compact size, such a television set is extremely portable. This is made possible, in part, by the manner in which the picture display block can be swung to a closed position when it is not necessary to view the television picture.

Secondly, with the picture display block swung into the viewing position, light passing from the rear of that block, through the liquid crystal display panel, is reflected from a mirror to be seen by the user. Changeover of the picture display block from the closed to the opened state is accomplished by on-touch operation. Moreover, due to the efficiency with which incident light is utilized, with light absorption being minimized, and due to the fact that this light enters the picture display block from the opposite side to the viewing position of the user, there is no danger of this incident illumination being shaded by the user's body. For these reasons, a clear picture can be viewed under a wide range of conditions of ambient illumination. It is therefore unnecessary to dissipate battery power to provide additional illumination, so that a low power consumption and a long battery life can be attained.

Thirdly, since an AM radio receiver circuit is incorporated in addition to the TV reception circuits, and an earphone jack is provided at the right-hand side of the set, it is possible for the user to listen to AM radio broadcasts or TV sound broadcasts while carrying the television set in a pocket.

Fourthly, circuit components, external operating members, etc which are closely related in function are positioned close to one another. Such components include for example the channel indicator section and the channel selection knob, the rod antenna and the external antenna jack, the loudspeaker and the earphone jack.

Fifthly, operation of the set is facilitated by the fact that the components of the operating section are disposed to the right of the picture display block.

Sixthly, due to the incorporation of a video jack, the television set can be connected to other types of video apparatus, and thus can be used as a personal data-processing terminal.

In addition, since the circuit system is divided basically into two circuit blocks, and since components are mounted on the upper and lower sides of the respective circuit boards of these circuit blocks in accordance with component size and shape, a high degree of component packing density is attained. Moreover this facilitates inspection and adjustment operations at the time of manufacture, as well as parts changeover or other maintenance work carried out during after-sales service. Also, due to the fact that the drive circuits for the liquid crystal display panel are mounted on the display panel substrates, the number of interconnecting leads between the liquid crystal display panel and the circuit boards is made extremely low. This facilitates the manufacturing process, with respect to interconnection of the liquid crystal display panel and the circuit boards, and also provide enhanced reliability due to the low number of connecting leads required.

From the description of the preferred embodiment given hereinabove, it will be apparent that the basic essential features of a liquid crystal display television receiver according to the present invention are as follows. The external configuration of the outer case of the television set is oblong and flat, i.e. the depth dimension (the minor dimension of a front, rear, left or right side of the case, as defined hereinabove) is substantially smaller than the length or breadth dimension (these being the major and minor dimensions of the upper or lower side of the case, as defined hereinabove). It is a further essential feature of such a liquid crystal display television receiver that a recessed portion is formed in a central region of the upper side of the case, with a mirror being fixedly mounted in a lower region of this recessed portion, the mirror being aligned with the plane of the reflecting surface thereof substantially parallel to the upper side of the case. A picture display block comprising a transmission-type liquid crystal display panel is coupled to the case such as to be movable between a closed state, in which the picture display block is oriented closely adjacent to the mirror and parallel thereto, and an opened state in which the picture display block is oriented at a fixed inclination to the mirror. It is a further essential feature of such a television set that an operating section, comprising at least those external operating members necessary for selection of a television channel and for control of loudspeaker volume, are disposed within a portion of the case which is to the right of the above-mentioned central region thereof.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A liquid crystal display television receiver powered by batteries, comprising:
   a case having an upper side with a recessed portion formed in a central region thereof;
   a mirror fixedly mounted within said recessed portion, below said upper side of said case;
   a picture display block comprising a liquid crystal display panel, said picture display block being movably mounted with respect to said case such as to permit said picture display block to be selectively swung into a closed position in which said picture display block is disposed within said recessed portion of said case, closely adjacent to said mirror, and into an opened position in which said picture display block is oriented at a predetermined inclination with respect to said mirror, whereby with said picture display block in said opened position, incident light entering said liquid crystal display panel from the opposite side thereof to said mirror is transmitted through said liquid crystal display panel to be reflected from said mirror as a television image, visible when said liquid crystal display television receiver is viewed from a direction substantially opposite to the direction of incidence of said incident light on said liquid crystal display panel;
   a loudspeaker mounted within said case;
   an antenna mounted on of said case;
   television receiver circuit means disposed within said case, for receiving television signals from said antenna and producing therefrom video signals to drive said liquid crystal display panel and audio signals to drive said loudspeaker, and;
   an operating section comprising a plurality of external operating members including at least a first external operating member for controlling selection of television channels by said television receiver circuit means and a second external operating member for controlling a level of sound output from said loudspeaker.

2. A liquid crystal display television receiver according to claim 1, in which said external operating members of said operating section are disposed in said case at positions to the right side of said recessed portion of said case, as seen along said viewing direction.

3. A liquid crystal display television receiver according to claim 2, in which said loudspeaker is mounted within said case at a position disposed to the right side of said recessed portion of said case, as seen along said viewing direction.

4. A liquid crystal display television receiver according to claim 3, in which said television receiver circuit means comprise an integrally formed tuner unit coupled to receive television signals from said antenna, said tuner unit being controlled by said first external operating member for selecting a television channel, and in which said tuner unit is positioned within said case below a lower face of said mirror and above a lower side of said case.

5. A liquid crystal display television receiver according to claim 4, in which said batteries are contained within said case, adjacent to said tuner unit, positioned below said mirror lower face and above said case lower side.

6. A liquid crystal display television receiver according to claim 1, in which said mirror is aligned substantially parallel to said upper side of said case.

7. A liquid crystal display television receiver according to claim 1, in which said liquid crystal display panel comprises a first transparent substrate having data electrodes formed thereon and a second transparent substrate having scanning electrodes formed thereon, and in which said television receiver circuit means further comprise a data electrode drive circuit for producing signals to drive said data electrodes and a scanning electrode drive circuit for producing signals to drive said scanning electrodes, each of said data electrode drive circuit and scanning electrode drive circuit being implemented as separate integrated circuit units respectively, and in which said data electrode drive circuit is mounted upon said first transparent substrate and said scanning electrode drive circuit is mounted upon said second transparent substrate.

8. A liquid crystal display television receiver according to claim 4 or claim 5, in which at least a part of said television receiver circuit means are implemented as a circuit board which is mounted below said mirror lower face and above said batteries, and in which components of substantially large size constituting said television receiver circuit means, including at least said tuner unit, are mounted upon a lower face of said circuit board, with an upper face of said circuit board being disposed closely adjacent to said lower face of said mirror.

9. A liquid crystal display television receiver according to claim 1, and further comprising a plurality of jacks mounted within said case, including at least a video jack coupled to said television receiver circuit means, for enabling transfer of video signals from an external video signal source and display of corresponding video data by said picture display block.

10. A liquid crystal display television receiver according to claim 5, in which said batteries are disposed within said case at positions located between a front side of said case and said tuner unit, as seen along said viewing direction.

11. A liquid crystal display television receiver according to claim 10, in which said antenna is mounted upon a rear face of said case, as seen along said viewing direction.

12. A liquid crystal display television receiver powered by batteries, comprising:
 a case having an upper side with a recessed portion formed in a central region thereof;
 an antenna mounted on the exterior of said case; television receiver circuit means disposed within said case, for receiving television signals from said antenna and producing therefrom video signals and audio signals;
 a mirror fixedly mounted within said recessed portion, below said upper side of said case;
 a picture display block comprising a liquid crystal display panel, said picture display block being movably mounted with respect to said case such as to permit said picture display block to be selectively swung into a closed position in which said picture display block is disposed within said recessed portion of said case, closely adjacent to said mirror, and into an opened position in which said picture display block is oriented at a predetermined inclination with respect to said mirror, whereby with said picture display block in said opened position, incident light entering said liquid crystal display panel from the opposite side thereof to said mirror is transmitted through said liquid crystal display panel to be reflected from said mirror as a television image, visible when said liquid crystal display television receiver is viewed from a direction substantially opposite to the direction of incidence of said incident light on said liquid crystal display panel, said liquid crystal display panel comprising a first transparent substrate having data electrodes formed thereon and a lower transparent substrate having scanning electrodes formed thereon, and in which said television receiver circuit means comprise a data electrode drive circuit for producing signals in accordance with said video signal to drive said data electrodes and a scanning electrode drive circuit for producing signals to drive said scanning electrodes, each of said data electrode drive circuit and scanning electrode drive circuit being implemented as separate integrated circuit units respectively, and in which said data electrode drive circuit is mounted upon said first transparent substrate and said scanning electrode drive circuit is mounted upon said second transparent substrate;
 a circuit board which is mounted below and immediately adjacent to a lower face of said mirror, with components of substantially large size comprising a part of said television receiver circuit means, including at least a tuner unit, being mounted upon a lower face of said circuit board;
 a loudspeaker driven by said audio signals, mounted within said case and disposed to the right of said recessed portion of said case upper side, as seen along said viewing direction, and;
 an operating section comprising a plurality of external operating members including at least a first external operating member for controlling selection of television channels by said television receiver circuit means and a second external operating member for controlling a level of sound output from said loudspeaker, said external operating members of said operating section being disposed in said case at positions to the right side of said recessed portion of said case, as seen along said viewing direction.

* * * * *